Feb. 21, 1956 W. H. CHADBOURNE 2,735,699
SNAP FIT PLASTIC PIPE CONNECTOR ASSEMBLY
Filed Jan. 23, 1951 2 Sheets-Sheet 1

INVENTOR.
William H. Chadbourne
BY Nathaniel Frucht
ATTORNEY

United States Patent Office 2,735,699
Patented Feb. 21, 1956

2,735,699
SNAP FIT PLASTIC PIPE CONNECTOR ASSEMBLY

William H. Chadbourne, Evanston, Ill., assignor to The Danielson Manufacturing Company, a corporation of Connecticut Application January 23, 1951, Serial No. 207,385

2 Claims. (Cl. 285—71)

The present invention relates to pipe connectors, and has particular reference to the construction of pipe connector assemblies for low pressure tubing installations.

The principal object of the invention is to provide an improved connector assembly for copper tubing and other smooth surface piping, which is assembled and locked by press fit.

Another object of the invention is to provide an improved tubing connector assembly having parts made of slightly yielding plastic material, and particularly nylon.

A further object of the invention is to provide a basic connector assembly T and associated parts, which may be assembled for line connections, T connections, elbow connections, and for extensions, reduced piping, and threaded pipes, as desired.

With the above and other objects and advantageous features in view, the invention consists of a novel arrangement of parts more fully disclosed in the detailed description following, in conjunction with the accompanying drawings, and more specifically defined in the claims appended thereto.

It has been found desirable to provide a connector assembly which is particularly suitable for copper tubing and other smooth surface metal piping, and which may be assembled by press fit to tightly hold against the low pressures encountered in many piping applications. I have therefore devised a plastic type assembly, the preferred material being nylon, which includes a basic T and associated parts adapted to be assembled into selected pipe connections, the associated parts being designed to press fit and lock against separation.

Figure 1:
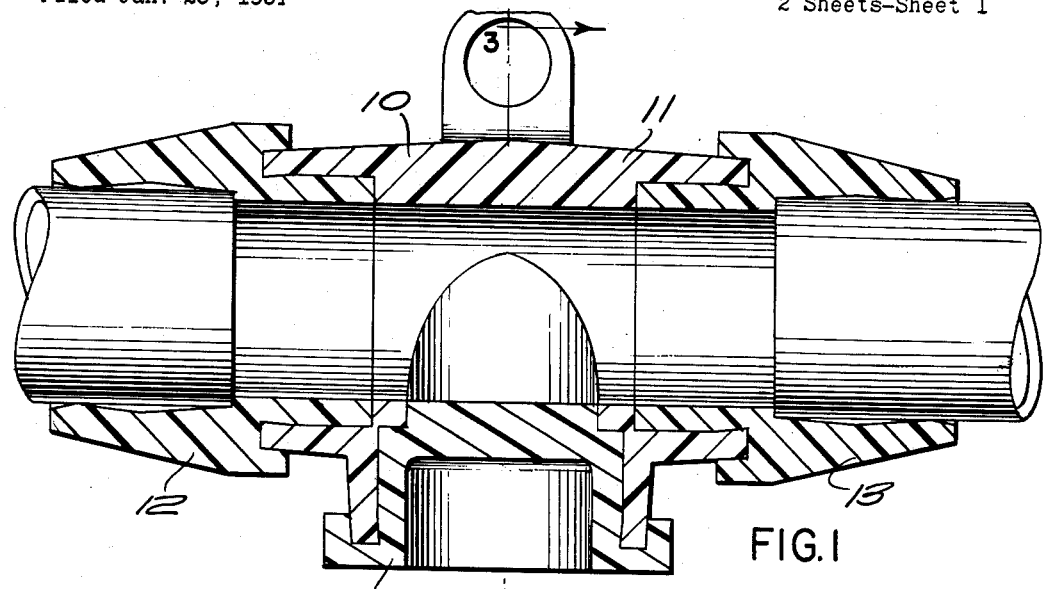
Fig. 1 is a view, partly in section, of an illustrative line connector assembly.

Referring to the drawings, an illustrative assembly 10 is shown in Fig. 1, comprising a basic T 11, two adaptors 12, 13, and a closure plug 14. The basic T 11 is of generally T shape, with a central flow passage 15 and three flow sockets 16, 17 and 18 of uniform size, each socket being of shell form with an outwardly extending ring flange 19 of slightly larger diameter than the diameter of the central flow passage to provide an annular abutment shoulder, the outer surface of the flange being tapered inwardly as indicated at 19a and the inner surface being cylindrical as indicated at 19b and then tapered inwardly as indicated at 19c as illustrated, whereby a conical tip with parallel inner and outer walls is provided. A pierced handle element 20 may be provided for securing the connection to a hook or to a suitable support.

Figure 5:
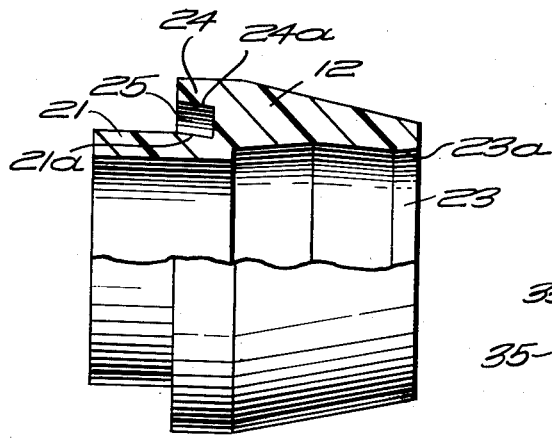
Fig. 5 is a view of a line adaptor, partly in section.
Figure 6:
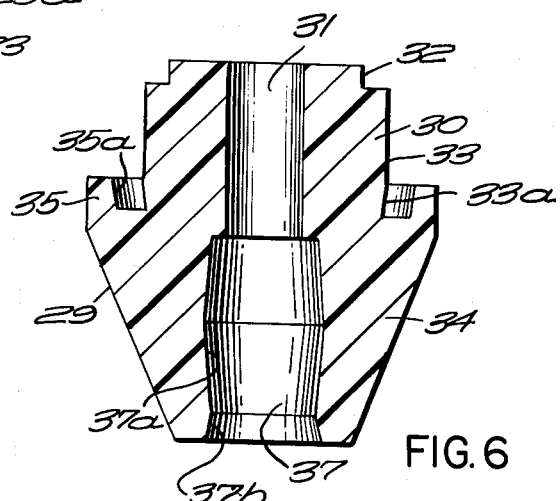
Fig. 6 is a sectional view of a reduction piping adaptor.

The line adaptor 12, see Fig. 5, is of tubular form and has a nipple 21 adapted to seat in one of the sockets, the nipple 21 being internally bored to correspond to the flow passage diameter and being generally cylindrical on its outer surface and slightly tapered at its inner end as indicated at 21a, and has a tubing grip portion 22 of slightly greater internal diameter for receiving a metal tubing end, the internal surface being concave as shown by the reference numeral 23, and terminating in an outwardly tapered portion 23a. A rear annular bead 24 is spaced from the outer surface of the nipple with its inner wall inclined as indicated by the reference numeral 24a to be parallel to the tapered portion 21a, to provide an annular recess 25 whereby a conical channel is provided in which the socket ring flange end is received and the nipple 21 seats in the flange 19 with press fit to provide a substantial lock sufficient to securely hold the parts together under low pressure fluid flow conditions.

Figures 2, 3:
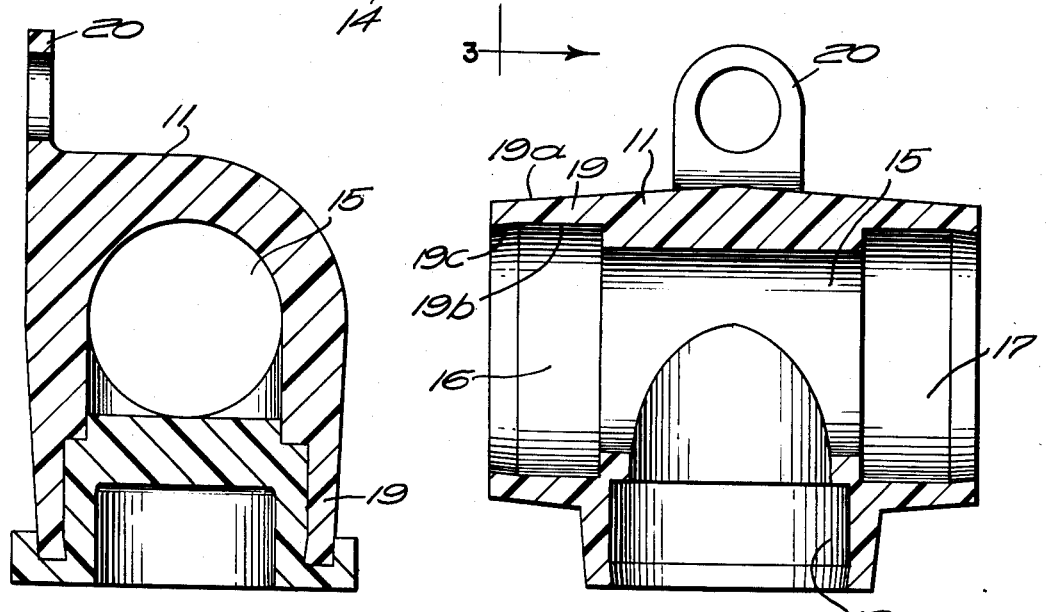
Fig. 2 is a sectional detail of the basic T of the assembly.
Fig. 3 is a section on the line 3—3 of Fig. 1.
Figure 4:
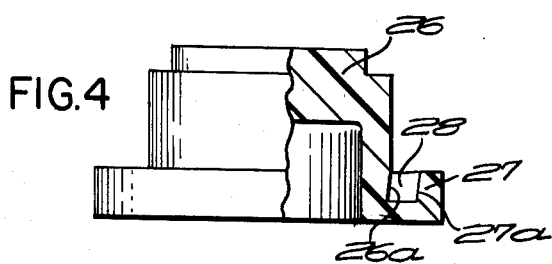
Fig. 4 is a view of a closure plug, partly in section.

Any socket opening of the base T may be closed off by a closure plug 14, see Fig. 3, which has a stepped cup portion 26 having a cylindrical outer wall with an inwardly tapered lower portion 26a and an annular bead 27 having its inner wall tapered as indicated at 27a to conform to the portion 26a, and forming an annular recess 28 with the cup portion outer wall whereby the cup portion seats into the flange of the socket and receives the flange into the recess 28 with a press fit.

Similarly, a reduction adaptor 29 may be set into any socket opening, the adaptor 29 having a cylindrical body 30 with a flow passage 31, the end 32 of the body being reduced and its outer wall 33 having its lower portion 33a slightly tapered inwardly. The forward portion 34 of the body is of conical form, with a rear annular bead 35 having its inner wall 35a tapered to conform to the body wall portion 33a, and forming an annular recess 36 with the outer wall of the body, whereby the body can seat in a selected socket, the ring flange being received in the recess 36 with a press fit. The forward end 37 of the flow passage is concave, as indicated at 37a, with an outwardly tapered inlet section 37b.

Figure 7:
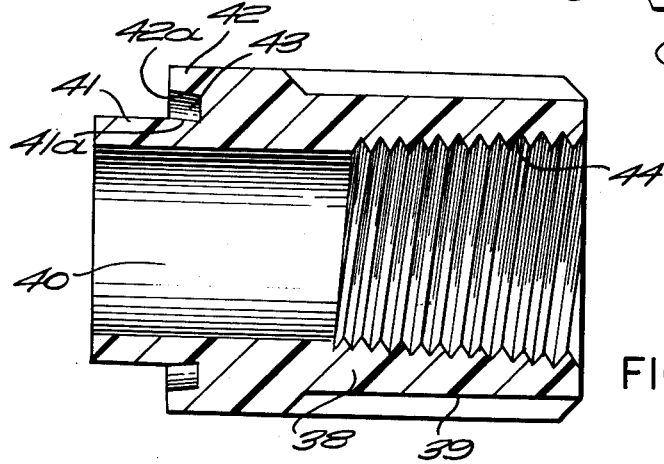
Fig. 7 is a sectional view of an adaptor for threaded pipe.
Figure 8:
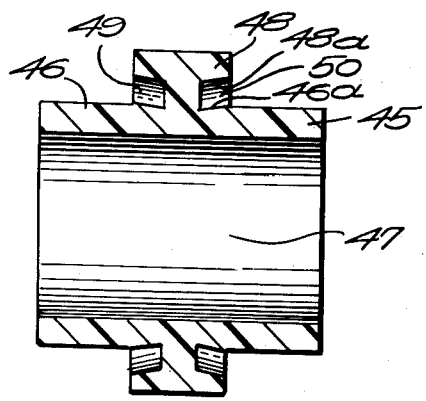
Fig. 8 is a sectional view of a connector element for connecting assemblies together.

Although the assembly is designed for use with smooth surface tubing, an adaptor 38 such as illustrated in Fig. 7 may be used for threaded tubing. The adaptor 38 has a cylindrical body 39 with a flow passage 40, the body having its rear end formed as a ring flange 41 for seating in a socket opening, the outer surface of the flange 41 being cylindrical with its inner portion 41a slightly tapered inwardly, and having a set back annular bead 42 spaced from the outer wall of the flange 41 and with its inner wall tapered as indicated at 42a to provide an annular recess 43, whereby the adaptor may be seated in a selected socket with press fit. The forward end of the flow passage 37 is threaded as indicated at 44, the threads having a taper to provide a wedge fit over a threaded tubing end.

Since it is sometimes desirable to connect several assemblies in adjacency, a connector 45 such as shown in Fig. 7 is provided, the connector having a generally cylindrical body 46 with a flow passage 47, and a central annular external T shaped projection 48, the outer wall of the body adjacent the projection being slightly inclined as indicated at 46a and the inner walls of the projection being inclined to correspond as indicated at 48a, to form annular inclined recesses 49, 50 whereby a press fit can be made with the basic T's.

The above described assembly parts are preferably made of nylon, with the surfaces of the engaging parts slightly tapered as illustrated so that the slightly yielding characteristic of nylon provides a firm press fit of the assembled parts; any other suitable plastic may be used which has similar slightly yielding characteristics and which will lock firmly upon a press fit of the engaging portions.

Although I have described a specific constructional embodiment of the invention, it is obvious that changes in the size, shape and arrangement of the parts and in their material, may be made to suit different piping and tubing connection requirements, without departing from the spirit or the scope of the invention as defined in the appended claims.

I claim:

1. In a pipe connector assembly of slightly yieldable plastic material, a central body portion having a flow passage formed therein, a socket communicating with the central flow passage, said socket being defined by an annular flange formed integral with said body portion and having an inner diameter greater than the diameter of said central flow passage to form an annular shoulder, said flange terminating in a conically formed tip converging toward the free end of the flange, said socket releasably receiving an adaptor therein, said adaptor including a body having a nipple formed integral therewith, said nipple including an outer cylindrical portion having an outer surface parallel to the inner surface of said flange and being slidably received thereby, the outer edge of said nipple abutting against said shoulder, the inner portion of said nipple being inclined toward the longitudinal axis thereof, a flow passage formed in said adaptor, the diameter of the portion of the adaptor flow passage extending through said nipple being substantially equal to the diameter of said central flow passage, an annular bead formed integral with said adaptor body and spaced from said nipple to define an annular recess therewith, the inclined portion of said nipple forming a wall of said recess, the inner surface of said bead being inclined in parallel relation to the inner portion of said nipple and defining the outer wall of said recess, said recess forming a conical channel for snap receiving and releasably retaining said conically formed tip therein.

2. In a pipe connector assembly as set forth in claim 1, wherein said slightly yieldable plastic material is formed of nylon.

References Cited in the file of this patent

UNITED STATES PATENTS

| | | |
|---|---|---|
| 269,011 | Clatworthy | Dec. 12, 1882 |
| 592,991 | Lewis | Nov. 2, 1897 |
| 750,444 | Fisher | Jan. 26, 1904 |
| 1,600,739 | Scherer | Sept. 21, 1926 |
| 1,651,342 | Draper | Nov. 29, 1927 |
| 1,722,676 | Parker | July 30, 1929 |
| 1,890,151 | Hadley | Dec. 6, 1932 |
| 1,921,642 | Stephenson | Aug. 8, 1933 |
| 1,949,596 | Anderson | Mar. 6, 1934 |
| 2,099,056 | Ferngren | Nov. 16, 1937 |
| 2,167,865 | Beecher | Aug. 1, 1939 |
| 2,274,258 | Roselle | Feb. 24, 1942 |
| 2,366,975 | McChesney | Jan. 9, 1945 |
| 2,372,182 | Barr | Mar. 27, 1945 |
| 2,431,778 | Sosaya | Dec. 2, 1947 |
| 2,451,438 | Hartman | Oct. 12, 1948 |
| 2,470,359 | McLean | May 17, 1949 |
| 2,470,373 | Sayers | May 17, 1949 |
| 2,487,400 | Tupper | Nov. 8, 1949 |
| 2,507,535 | Madsen | May 16, 1950 |
| 2,548,004 | Duefrene | Apr. 10, 1951 |
| 2,560,114 | Kennon | July 10, 1951 |

FOREIGN PATENTS

| | | |
|---|---|---|
| 480,186 | Canada | Jan. 15, 1952 |